(12) United States Patent
Hatfield

(10) Patent No.: US 6,254,374 B1
(45) Date of Patent: Jul. 3, 2001

(54) SYSTEM FOR PRODUCING POLYMERIC FILM

(75) Inventor: Eric Hatfield, Cincinnati, OH (US)

(73) Assignee: FlexTech, Packaging Ltd., Cincinnati, OH (US)

( * ) Notice: Subject to any disclaimer, the term of this patent is extended or adjusted under 35 U.S.C. 154(b) by 0 days.

(21) Appl. No.: 09/242,000

(22) Filed: Feb. 2, 1999

Related U.S. Application Data

(62) Division of application No. 09/018,482, filed on Feb. 4, 1998.

(51) Int. Cl.⁷ .................................................. B29C 47/38
(52) U.S. Cl. ................. 425/376.1; 425/205; 366/76.3
(58) Field of Search .............. 264/211.23; 425/204, 425/205, 376.1; 366/76.1, 76.3, 76.4, 76.9, 76.91, 76.93

(56) References Cited

U.S. PATENT DOCUMENTS

| | | | |
|---|---|---|---|
| 2,366,673 | 1/1945 | Paley | 156/43 |
| 2,382,655 | 8/1945 | Nichols | 425/130 |
| 2,540,146 | 2/1951 | Stober | 523/351 |
| 2,912,041 | 11/1959 | Boggs | 264/121 |
| 3,175,807 | 3/1965 | Gouveia | 366/103 |
| 3,183,553 | 5/1965 | Slater | 198/550.1 |
| 3,256,562 | 6/1966 | Heard, Jr. | 425/132 |
| 3,278,986 | 10/1966 | Welt | 425/378.1 |
| 3,310,617 | 3/1967 | Dygert et al. | 264/53 |
| 3,342,901 | 9/1967 | Kosinsky et al. | 525/197 |
| 3,344,218 | 9/1967 | Chopra et al. | 264/211.22 |
| 3,345,690 | 10/1967 | Hagen | 425/145 |
| 3,360,821 | 1/1968 | Marcus et al. | 415/208.1 |
| 3,418,694 | 12/1968 | Strauss | 425/169 |
| 3,459,840 | 8/1969 | Wood | 264/37.26 |
| 3,520,027 | 7/1970 | Amos et al. | 425/131.1 |
| 3,535,408 | 10/1970 | Ronden | 264/37.32 |
| 3,538,203 | 11/1970 | Overcashier et al. | 264/53 |
| 3,645,659 | 2/1972 | Schott, Jr. | 425/204 |
| 3,672,803 | 6/1972 | Rees | 425/197 |
| 3,746,489 | 7/1973 | Rizzi et al. | 425/205 |
| 3,773,586 | 11/1973 | Koch et al. | 156/193 |
| 3,797,702 | 3/1974 | Robertson | 222/1 |
| 3,862,594 | 1/1975 | Stölting et al. | 100/95 |
| 3,920,229 | 11/1975 | Piggott | 259/192 |

(List continued on next page.)

OTHER PUBLICATIONS

Foremost Machine Builders Inc. Product information—Blending Appatatus, http://www.foremostmachine.com/Products/blenders.html.*

Hosokawa Alpine Aktiengesellschaft, *Film Blowing Lines Mono and Coextrusion Brochure*, 1995.

Hosokawa Alpine Aktiengesellschaft, *Plate Die Head for Films with Up to 7 Layers Brochure*, 1995.

Process Control Corporation, *Gravimetric Blending Systems Brochure* (date unknown).

Processing Technologies, Inc., *Trident Series Extrusion Systems Brochure* (No Date).

Foremost, *Product Review: Crammer Feeders Brochure* (No Date).

*Primary Examiner*—Robert Davis
*Assistant Examiner*—Joseph Del Sole
(74) *Attorney, Agent, or Firm*—Wood, Herron & Evans, L.L.P.

(57) ABSTRACT

Efficient, improved output systems and methods for producing polymeric film are described. Such systems include a feed assembly for positively and substantially constantly feeding polymeric raw material to a grooved feed extruder. The system also includes suitable apparatus for forming the molten polymer output from the extruder into film. The raw material may consist of 100% pelletized polymer, 100% polymer fluff, or any combination of the two. If necessary, a blending apparatus is included to blend the pellets and fluff prior to feeding the raw material to the extruder.

4 Claims, 2 Drawing Sheets

U.S. PATENT DOCUMENTS

| | | | |
|---|---|---|---|
| 3,976,730 | 8/1976 | Cushing | 264/140 |
| 4,003,498 | 1/1977 | Moneghan | 222/1 |
| 4,014,462 | 3/1977 | Robertson | 222/136 |
| 4,063,860 | 12/1977 | Cushing | 425/202 |
| 4,108,334 | 8/1978 | Moller | 222/136 |
| 4,125,069 | 11/1978 | Smith et al. | 100/45 |
| 4,134,714 | 1/1979 | Driskill | 425/113 |
| 4,139,309 | 2/1979 | Billingsley | 366/186 |
| 4,148,100 | 4/1979 | Moller | 366/156.1 |
| 4,201,485 | 5/1980 | Walker | 366/156.1 |
| 4,222,728 | 9/1980 | Bacher et al. | 425/305.1 |
| 4,228,005 | 10/1980 | Covington, Jr. et al. | 210/207 |
| 4,243,629 | 1/1981 | Tramezzani | 264/563 |
| 4,244,903 | 1/1981 | Schnause | 264/68 |
| 4,249,877 | 2/1981 | Machen | 425/204 |
| 4,287,147 | 9/1981 | Hungerford | 264/146 |
| 4,303,344 | 12/1981 | Müller | 366/76.3 |
| 4,319,871 | 3/1982 | McAlister | 425/376.1 |
| 4,320,075 * | 3/1982 | Nielson | 264/32 |
| 4,333,789 | 6/1982 | McAlister | 156/499 |
| 4,353,851 | 10/1982 | Godfrey et al. | 264/37.32 |
| 4,353,967 | 10/1982 | Hungerford | 428/520 |
| 4,361,373 | 11/1982 | Gallusser et al. | 439/312 |
| 4,385,016 | 5/1983 | Gwinn | 264/37.26 |
| 4,385,883 | 5/1983 | Hanslik | 425/204 |
| 4,413,969 | 11/1983 | McDonald | 425/217 |
| 4,426,018 | 1/1984 | Ward | 222/1 |
| 4,426,201 * | 1/1984 | Cohen | 425/147 |
| 4,440,702 | 4/1984 | Susnjara | 264/37.32 |
| 4,446,094 | 5/1984 | Rossiter | 264/349 |
| 4,448,737 | 5/1984 | Johnson | 264/53 |
| 4,467,969 | 8/1984 | Godfrey et al. | 241/101.8 |
| 4,493,806 | 1/1985 | Hatzkelis et al. | 264/28 |
| 4,500,481 | 2/1985 | Marx III | 264/40.6 |
| 4,564,349 | 1/1986 | Brown | 425/207 |
| 4,619,799 | 10/1986 | Teerling | 264/101 |
| 4,659,301 | 4/1987 | Yoshida | 425/129.1 |
| 4,714,573 | 12/1987 | Yoshida | 264/37.33 |
| 4,738,808 | 4/1988 | Hammer et al. | 264/40.1 |
| 4,797,237 | 1/1989 | Hammer et al. | 264/45.3 |
| 4,812,048 | 3/1989 | Neumann et al. | 366/141 |
| 4,824,627 | 4/1989 | Hammer et al. | 264/211.21 |
| 4,832,889 | 5/1989 | Johnson | 264/68 |
| 4,863,652 | 9/1989 | Chang | 264/406 |
| 4,877,568 | 10/1989 | Austin | 264/211.21 |
| 4,894,001 | 1/1990 | Petschner | 425/200 |
| 4,925,512 | 5/1990 | Briand | 156/201 |
| 4,937,034 | 6/1990 | Sewell | 264/349 |
| 4,958,770 | 9/1990 | Mitchell | 239/145 |
| 4,976,904 | 12/1990 | Bilhorn | 264/104 |
| 5,143,738 * | 9/1992 | Nordin | 426/231 |
| 5,148,943 * | 9/1992 | Moller | 222/1 |
| 5,259,749 | 11/1993 | Meixner et al. | 425/205 |
| 5,261,743 | 11/1993 | Moller | 366/196 |
| 5,290,498 | 3/1994 | Shiraki et al. | 264/209.2 |
| 5,304,618 | 4/1994 | Atwell et al. | 526/293 |
| 5,332,309 | 7/1994 | Ramazzotti et al. | 366/88 |
| 5,358,327 | 10/1994 | Derezinski et al. | 366/79 |
| 5,366,365 | 11/1994 | Sullivan et al. | 425/144 |
| 5,369,202 | 11/1994 | Atwell et al. | 526/293 |
| 5,424,013 | 6/1995 | Lieberman | 264/40.1 |
| 5,433,593 | 7/1995 | Berger | 425/186 |
| 5,465,503 | 11/1995 | Oates | 34/179 |
| 5,468,436 | 11/1995 | Kirtland | 264/112 |
| 5,503,790 | 4/1996 | Clements | 264/176.1 |
| 5,534,204 | 7/1996 | Aoki et al. | 264/102 |
| 5,556,581 | 9/1996 | Aoki et al. | 264/40.1 |
| 5,569,713 | 10/1996 | Lieberman | 525/146 |
| 5,589,203 | 12/1996 | Sato | 425/147 |
| 5,599,099 | 2/1997 | Bullivant | 366/141 |
| 5,607,700 | 3/1997 | Kando et al. | 425/71 |

* cited by examiner

SYSTEM FOR PRODUCING POLYMERIC FILM

This is a divisional of application Ser. No. 09/018,482, filed Feb. 4, 1998.

FIELD OF THE INVENTION

The present invention is directed to systems and methods for producing polymeric film, and more particularly to such systems and methods wherein improved output and efficiencies are realized.

BACKGROUND OF THE INVENTION

A wide variety of polymeric films are produced using extrusion technology. The composition of the film is dependant upon the end use to which the film is put. Examples of polymeric materials suitable for processing in an extrusion system for the production of film are polyethylene (high density, low density and linear low density), EVA, EVOH, polyamides, etc. Such materials can be processed in an extrusion system for blown film of single layer and co-extruded films with up to seven or more layers, including barrier and tie-layers. Typically, blown films or sheet films have thicknesses in the range of 0.4 to 40 mils. These films are useful in the food packaging and other packaging industries, as well as agricultural, automotive and a wide variety of other industries.

There are two principle types of extruders for melting and extruding polymeric materials in film production systems. The first is a "smooth bore" or smooth barrel extruder which has a smooth barrel over its entire length. There are numerous North American manufacturers of smooth bore extruders, including Davis Standard, Gloucester Engineering, Cincinnati Milacron and Brampton Engineering, among others.

In the production of polymeric film using a smooth bore extruder, generally the polymeric resin raw material is fed to the extruder in the form of pellets. Because waste and scrap film are generated during production of the polymeric film, which material can be recycled within the production facility, it is not uncommon to blend some proportion of the recycled material with the pellets. The scrap film is chopped using techniques and equipment well known in the art and is often referred to as "fluff" or "flake." This fluff can be fed into a smooth bore extruder along with the "virgin" resin pellets at ratios up to 50/50. If the equipment is specially designed, as much as 100% fluff can be fed into a smooth bore extruder. This is typically accomplished by a speed-controlled (ratio controlled) auger located in a hopper above the screw of the extruder. With this technique, there is no pre-mixing of the fluff with the virgin pellets and there is no control of the "head pressure" on the extruder throat. Another method for feeding fluff into a smooth bore extruder is to mix the fluff and pellets together and then introduce the blend into the throat of the extruder. This blend is force fed into the extruder using a specific type of feeder equipment commonly referred to as a "crammer" feeder. The force exerted by the crammer feeder pushes the blend into the extruder and is principally controlled by a torque setting. The speed of the crammer feeder auger is then adjusted to maintain the torque setting and thus the "head pressure" on the extruder screw. Because a smooth bore extruder's feed/pump rate output is significantly affected by the head pressure at the inlet, the second method for feeding fluff may be considered superior to the first because of the relative constancy of the head pressure.

The second common type of extruder is called a grooved feed extruder. Although used worldwide, these are commonly built in Germany and are available from companies such as Hosokawa Alpine Aktiengesellschaft of Augsburg, Germany. Such extruders were initially developed for processing high molecular weight, high density, polyethylene (HMWHDPE). Subsequently it was found that the pumping and melting characteristics of such extruders had certain advantages in the processing of other polymers also, particularly in blown film production applications. A grooved feed extruder has longitudinal grooves formed in the barrel beginning just downstream from the barrel inlet. These grooves do not extend the length of the barrel. As is well known in the art, the grooves are highly efficient at transferring energy from the extruder motor to the polymer and cause the polymer to rapidly melt very close to the extruder inlet.

Conventional wisdom has suggested that making extruded film in a grooved feed extruder utilizing fluff in the raw material, in any percentage, is not possible or not likely to be successful. It has been known to run in the range of 5–10% fluff into a grooved feed extruder via a typical gravity feed-type hopper. However, because of the perceived problems and problems actually experienced in feeding fluff to grooved feed extruders, manufacturing facilities that use grooved feed extruders typically send their scrap film (fluff) through an additional process step of re-pelletization and simply recycle and reuse the scrap in pellet form. It was and is believed that the reasons fluff cannot successfully be processed through a grooved feed extruder are: (1) that the fluff melts in the grooves and either plugs them or carbonizes or forms gels, which then may break loose and appear in the extruded film, thus rendering it non-usable; and (2) that fluff cannot readily and efficiently be fed to the grooved bore extruder and thus extruder output and capacity are diminished, thereby resulting in increased film cost.

What is needed is an efficient, enhanced output system and method for production of polymeric film in which productivity from the extruder is increased and a system and method are capable of utilizing anywhere from 0%–100% fluff in the feed material for the extruder.

SUMMARY OF THE INVENTION

In its broadest aspects, the present invention is directed to a system and method for producing polymeric film. The system includes as its primary components a grooved feed extruder force fed with polymeric raw material by means of a crammer feeder. The raw material, which can be any one or more of a wide variety of polymeric materials suitable for extrusion and subsequent processing into film, may contain in the range of 0to 100% fluff in combination with 0to 100% virgin pelletized polymeric material. Upstream of the crammer feeder, which itself is well known in the art, is an appropriate blending system for blending the fluff and pelletized feed material and feeding it to the crammer feeder, or for feeding pure fluff or pure pellets to the crammer feeder. The blending system is capable of processing raw material at ratios of 100% pellets and 0% fluff up to 100% fluff and 0% pellets, and any combination thereof in between. Downstream of the extruder is suitable processing equipment for forming sheet film, blown film, or any other desired form of polymeric film. The specific processing equipment downstream of the extruder for forming the final film product is not a critical part of the system of the present invention, and because many varieties of such processing equipment are known in the art, it will not be described in detail herein.

The system of the present invention has been operated and compared to a film forming system which utilizes a standard gravity feed hopper for feeding raw material to a grooved feed extruder. By way of comparison, the system of the present invention has resulted in increased output (as measured in pounds extruded per hour per revolution of extruder screw) on the order of 25% to 35% when a crammer feeder is used in combination with the grooved feed extruder, versus a system using the same extruder and a gravity feed-type hopper. This significant increase in output is at a level of 0% fluff in the raw material. When 100% fluff is used the extruder output improvement declines somewhat such that at 100% fluff the extruder output is approximately equivalent to a system using 100% pelletized feed material fed via a gravity feeder. Although this output is equivalent, the system of the present invention is still highly advantageous vis-a-vis the gravity feed system because it is operating with 100% fluff, rather than pelletized feed material, and thus the cost associated with re-pelletization is removed. Furthermore, when others were feeding up to 5–15% fluff into a grooved feed extruder without the use of a crammer feeder, output actually decreased by a percentage commensurate with the fluff percentage (i.e., 15% fluff resulted in approximately 15% decrease in output). The problems heretofore experienced and/or believed to exist with regard to utilizing fluff in a grooved feed extruder have not materialized. The film quality output from the system of the present invention is on par with that found in smooth bore extruders and grooved feed extruders that do not utilize any fluff in the feed material.

As the term is used herein, a crammer feeder is an apparatus for feeding the raw materials to the extruder and which consists of a hopper (typically conical) having a feed auger. The auger is driven by a torque-controlled motor but may also be a hydraulic-controlled motor. The essence of the crammer-type feeder is the application of constant torque on the auger which therefore may fluctuate in its rotational speed depending on the density of the feed material (i.e., speed will vary depending on the fluff/pellet ratio) and on the back pressure from the extruder (which also varies depending on the composition of the feed material). It will be appreciated that any suitable feeder assembly can be used in the context of the present invention so long as the raw material is fed substantially constantly and positively to the extruder.

While not forming an integral part of the system and method of the present invention, downstream of the extruder output is appropriate processing equipment to form the polymeric film. Such systems include lines for producing blown film in which the output from the extruder is in tubular form which is then expanded and ultimately slit and wound into rolls. The system and method of the present invention are equally applicable to single-layer and co-extruded films having up to seven layers or more. Materials which are suitable for processing include high density polyethylene, low density polyethylene, linear low density polyethylene, polypropylene, EVA, etc. Furthermore, for barrier films materials such as low density polyethylene, linear low density polyethylene, polyamides, EVOH, and various tie layers are also contemplated. Furthermore, metalecene polymers are contemplated. The output from the film production system can be used for plastic films in a wide variety of applications, including general packaging, food packaging, carrier bags, shrink and stretch wrap films, etc.

In operation, the method of the present invention contemplates feeding raw material comprising in the range of 0 to 100% fluff and 100 to 0% pelletized polymeric material, blended if desired or necessary, to a crammer feeder. The raw material is metered and fed to a grooved feed extruder via the crammer feeder and is processed in the extruder and extruded therefrom. Subsequently the polymeric material is formed into a film.

These and other features and advantages of the present invention will be appreciated and more fully understood with reference to the following detailed description taken in conjunction with the accompanying drawings.

BRIEF DESCRIPTION OF THE DRAWINGS

FIG. 3 is a cross-sectional view of the extruder shown in FIG. 1 taken on lines 3—3 of FIG. 1.

DETAILED DESCRIPTION OF THE INVENTION

Figure 1:
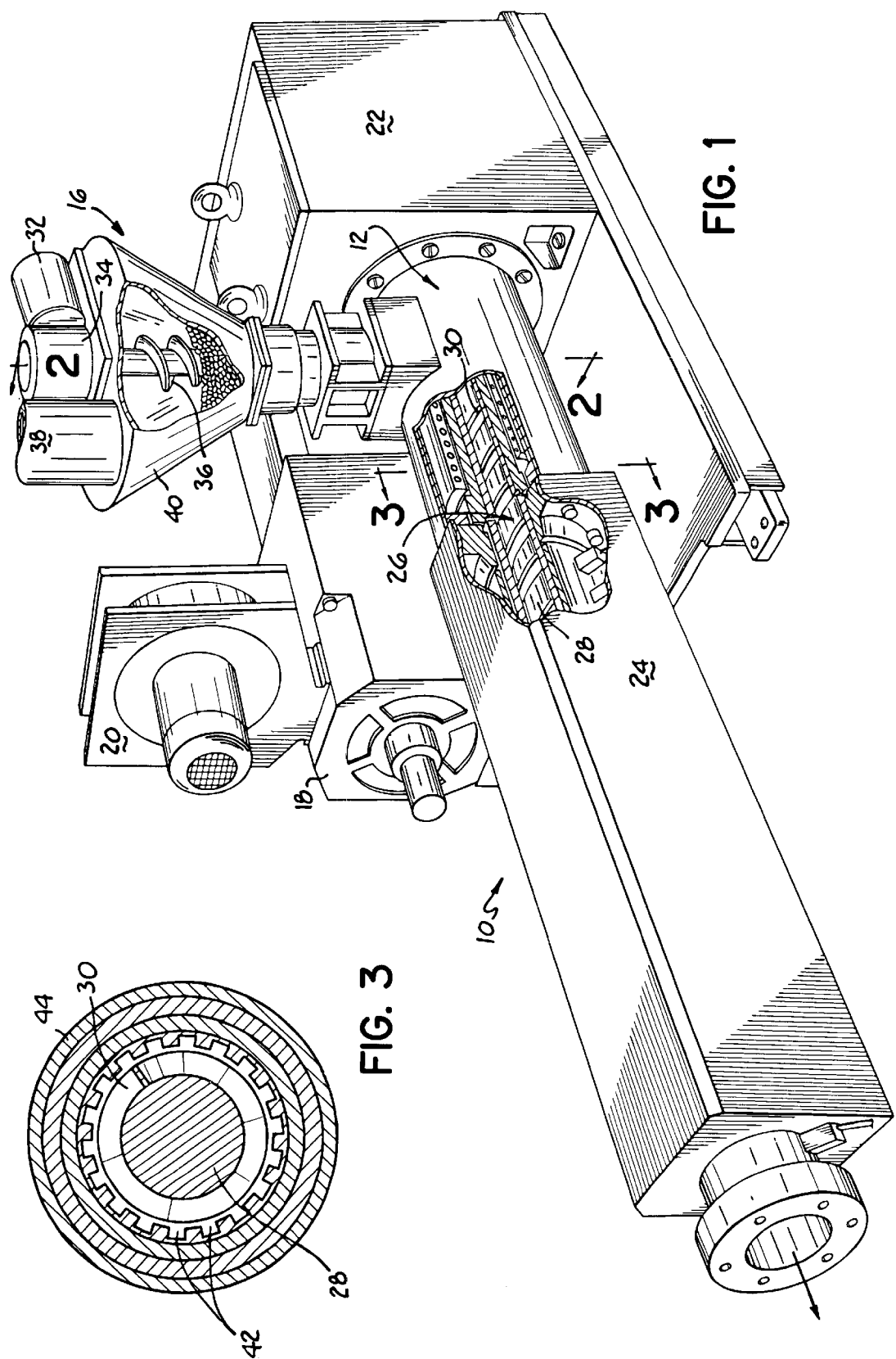
FIG. 1 is a perspective view, partially broken away, of a portion of one embodiment of the present invention.

FIG. 1 shows several of the components of the apparatus of the present invention. More particularly, FIG. 1 shows an extruder 10 having an input end 12 and an output end 14. Extruder 10 is a readily available grooved feed extruder such as is available from Hosokawa Alpine Aktiengesellschaft of Augsburg, Germany. In particular, an Alpine HS65 or HS90 grooved feed extruder can be utilized in the practice of the present invention. Mounted on inlet end 12 of extruder 10 is a crammer feeder assembly 16 such as Model CF-2V crammer feeder assembly available from Foremost Machine Builders of Fairfield, N.J. Extruder 10 further includes a drive motor 18, having a cooling fan 20 mounted thereon and a gear box 22. Although not explicitly shown, the output from extruder 10 via output end 14 then is processed in a film production apparatus such as blown film equipment also available from Hosokawa Alpine AG. The details of the film forming equipment are not necessary to critical to an understanding of the present invention and therefore are not described in greater detail herein. Suffice it to say that any available film forming equipment that can be operably connected to the output end of an extruder for forming any variety of polymeric film will be acceptable. As shown, and as is typically found in grooved feed extruders, extruder 10 includes an outer housing 24 and an internal bore 26 in which resides the extruder screw 28 which has helical flights 30 thereon.

Mounted to the inlet end 12 of extruder 10 is an assembly that substantially constantly and positively feeds the raw material to the extruder 10. One such assembly is crammer feeder assembly 16. Assembly 16 includes a torque or hydraulic-controlled motor 32 and a gear box 34 for driving auger 36. Crammer feeder assembly 16 is fed with raw material via inlet pipe 38 in the direction of the arrow. The torque or hydraulic-controlled motor for crammer feeder assembly auger 36 is set to provide a constant energy usage and thus the actual speed of the motor fluctuates up and down so as to provide a constant force on the extruder. This is to be differentiated from variable speed motors which simply can be set at a specific speed requirement and then the force on the extruder fluctuates as the motor torque changes to maintain the same auger speed.

Figure 2:
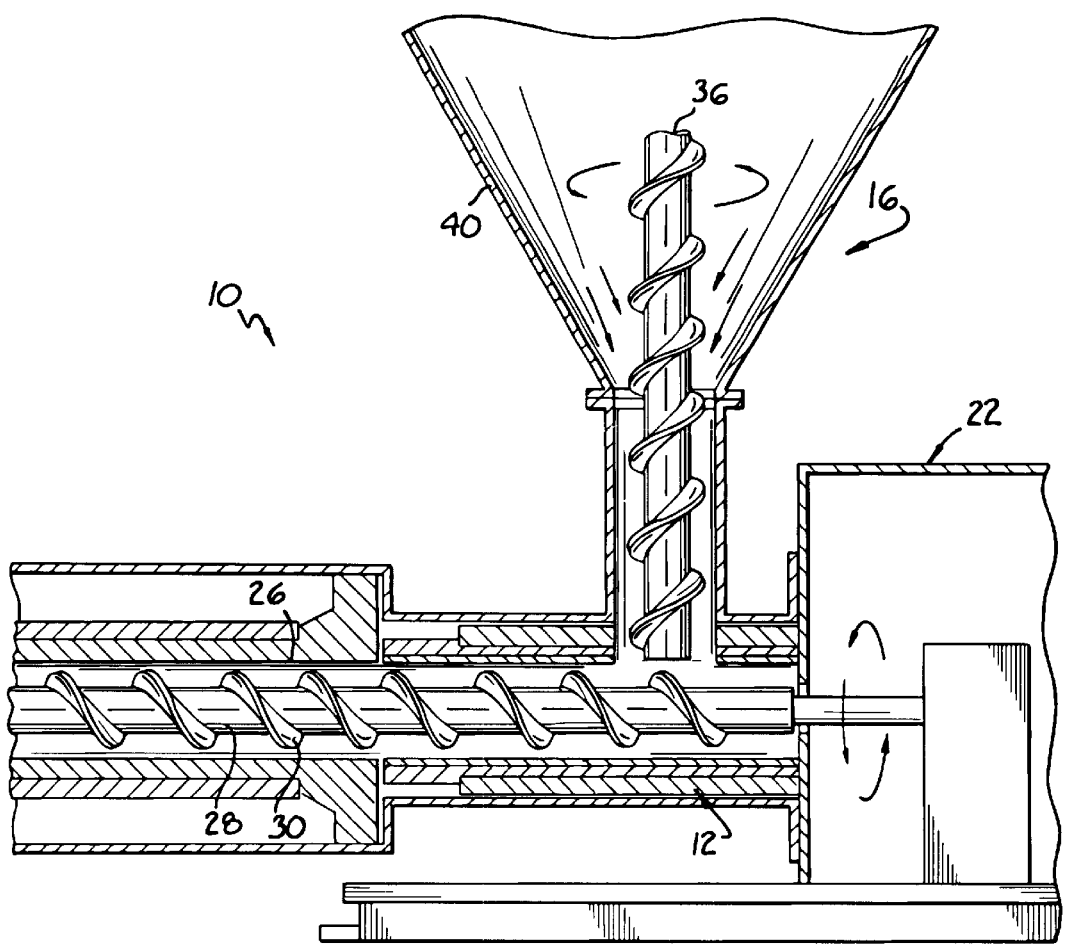
FIG. 2 is a partial cross-sectional view taken on lines 2—2 of FIG. 1.

The details of the inner face of crammer feeder assembly 16 and extruder 10 can be seen more specifically with reference to FIG. 2, which is a partial cross-sectional view taken on lines 2—2 of FIG. 1. As will be appreciated, the raw material fed to crammer feeder 16 is directed downwardly in the direction of the arrows within the conical housing 40 of crammer feeder 16. The torque-controlled auger drives and forcibly feeds the raw material into the throat section of the extruder adjacent at the input end 12 thereof. The raw material then travels along the barrel of extruder 10 by virtue of the action of extruder screw 28. Extruder barrel 26 is shown in cross-section in FIG. 3 and depicts the core of the extruder screw 28 as well as the helical flights 30 thereon. For a length of approximately 2–3 screw diameters at the input end of extruder 10 are longitudinal grooves 42 formed therein. The extruder is housed within an outer housing 44 at the input end. As is common in the use of grooved feed extruders (and all types of extruders) the back pressure within the extruder is monitored. The drive control is adjusted to maintain constant or nearly constant screw speed and therefore constant output. This is particularly important in the context of extrusion in film production lines where variances in extruder output will result in different thicknesses of material which can therefore deleteriously result in variations in thickness of the output of film, which is generally unacceptable. Furthermore the torque-controlled motor for the crammer feeder assembly 16 is operated to provide a constant torque to the crammer feeder auger 36. The importance of a constant or relatively constant torque results in a uniform amount of material being supplied to the extruder which again translates into a more uniform output in the film production equipment downstream of the extruder 10.

Figure 4:
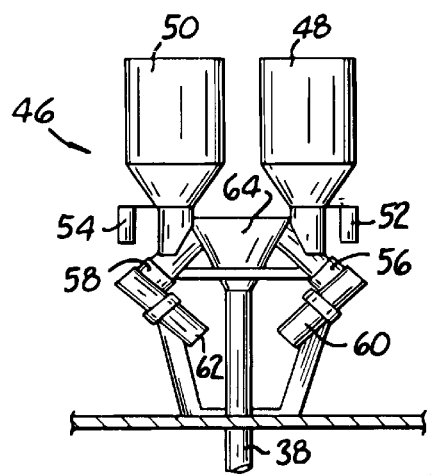
FIG. 4 is a schematic representation of a blending system for the raw material used in the system of the present invention.

With reference to FIG. 4 there is shown a blending system 46 which blends and supplies the raw materials via downcomer 38 to crammer feeder assembly 16. Blending system 46 can be any suitable system for blending raw material in the form of pelletized polymer and/or fluff. One suitable blending system is the Foremost fluff blending system Model No. CLWB-3 available from Foremost Machine Builders, Fairfield, N.J. Additionally, suitable fluff blending systems are available from Process Control Corporation. Blending system 46 itself comprises at least two hoppers 48 and 50 for the pelletized and fluff raw material, respectively. Each hopper 48, 50 may include a load cell 52, 54 for monitoring the weight and controlling the feed rate of raw material in the system. Additionally, each hopper 48, 50 has an auger 56, 58 associated therewith that can be set to control the feed rate of raw material. This may be accomplished using a constant speed auger or a uniform weight output auger. The augers 56, 58 are driven by control motors 60, 62, respectively, to feed the raw material to catch hopper or mixer 64, which itself may include an agitator (not shown). It is contemplated that the blending system can be utilized to blend a variety of pellet and fluff compositions. In certain contexts it may not be necessary to utilize a blending apparatus.

In use, the system of the present invention is readily adaptable to process 100% pelletized polymeric raw material containing 0% fluff and likewise is fully capable of processing 100% fluff raw material with 0% pelletized polymer. Also, any ratio of pellets/fluff in between 100%/0% and 0%/100% is processable in the system of the present invention for producing suitable polymeric film. As stated previously, a wide variety of raw materials can be processed through the system of the present invention to produce polymeric films of any suitable composition. Examples of suitable polymeric materials include high and low density polyethylene, linear low density polyethylene, polypropylene, EVA, polyamides and EVOH, etc. Once the desired blend ratio of fluff to pellets is selected, the system is operated and raw material blending system 46 blends the proper mix of raw material and supplies that via downcomer 38 to crammer feeder assembly 16. Assembly 16, in turn, forcibly and under constant torque on auger 36, feeds the blended raw material to the inlet end of extruder 12. The action of the grooved feed extruder 10 serves to melt and mix the polymer or polymer blend as it is conveyed along the length of extruder 10 to the output end 14 whereupon it is taken up and processed further through suitable film forming equipment. The result is polymeric film of desired composition which is of exceptional quality and consistency. Because of its capacity for processing fluff in any quantity ranging from 0% to 100% of the raw material, the system of the present invention is highly advantageous vis-a-vis prior film processing apparatus and systems.

While the invention has been described with reference to specific embodiments thereof, including crammer feeders, the invention is not intended to be so limited and various modifications and changes will become apparent to and appreciated by persons skilled in the art. The invention is therefore defined by and its scope is commensurate with that defined in the appended claims.

What is claimed is:

1. A system for producing polymeric film, comprising:

a grooved feed extruder for melting polymeric raw material and extruding molten polymeric material, said extruder having an input end and an output end;

a crammer feeder operated at substantially constant torque for substantially constantly and positively feeding polymeric raw material to said input end of said grooved feed extruder; and film forming apparatus for receiving the molten polymeric material from said output end of said extruder and forming the molten material into a film.

2. The system of claim 1 further comprising a blending apparatus for supplying the polymeric raw material to said crammer feeder.

3. The system of claim 1 wherein said crammer feeder has a torque-controlled motor drive.

4. The system of claim 1 wherein said crammer feeder has a hydraulic-controlled motor drive.

* * * * *